(12) United States Patent
Rittweger (10) Patent No.: US 9,487,053 B2
(45) Date of Patent: Nov. 8, 2016

(54) PNEUMATIC VEHICLE TIRE WITH SPECIFIED CIRCUMFERENTIAL SIDE WALL GROOVE

(71) Applicant: Continental Reifen Deutschland GmbH, Hannover (DE)

(72) Inventor: Stefan Rittweger, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/645,270

(22) Filed: Mar. 11, 2015

(65) Prior Publication Data

US 2015/0183276 A1 Jul. 2, 2015

Related U.S. Application Data

(63) Continuation of application No. PCT/EP2013/066045, filed on Jul. 31, 2013.

(30) Foreign Application Priority Data

Sep. 11, 2012 (DE) .................. 10 2012 108 455

(51) Int. Cl.
*B60C 13/02* (2006.01)
*B60C 13/00* (2006.01)
*B60C 5/00* (2006.01)

(52) U.S. Cl.
CPC .................. *B60C 13/02* (2013.01); *B60C 5/00* (2013.01); *B60C 13/001* (2013.04)

(58) Field of Classification Search
CPC ..... B60C 13/02; B60C 13/001; B60C 13/00; B60C 11/01
USPC ............................ 152/523, 209.16; D12/605
See application file for complete search history.

(56) References Cited

U.S. PATENT DOCUMENTS 3,508,594 A * 4/1970 French .................. 152/209.16
4,152,186 A * 5/1979 Shibata .................... 152/523 X (Continued)

FOREIGN PATENT DOCUMENTS

GB 2 010 755 A * 7/1979
JP 60038211 A * 2/1985

(Continued)

OTHER PUBLICATIONS

Online definition of "pattern", American Heritage Dictionary of the English Language, 5$^{th}$ ed., Houghton Mifflin Harcourt Publishing Company, 2011.*

(Continued)

*Primary Examiner* — Adrienne C Johnstone
(74) *Attorney, Agent, or Firm* — Walter Ottesen, P.A.

(57) ABSTRACT

A vehicle tire has a pattern visible in the side wall located in a groove thereof extending across the entire circumference of the tire and oriented in a circumferential direction (U). The groove is formed of first groove segments and second groove segments, which in the circumferential direction are arranged in alternating sequence one behind the other. Radially outwardly, the groove segments are each defined by a radially outward defining flank and radially inwardly, are defined by a radially inward defining flank defining the groove radially inward. The first groove segments are arranged radially outside the second groove segments and the transition between a first groove segment and the adjacent second groove segment is configured as a radial offset of the groove by the amount of displacement (a).

15 Claims, 5 Drawing Sheets (56) References Cited

U.S. PATENT DOCUMENTS 5,728,242 A * 3/1998 Barrese .................. B60C 13/02
152/523
8,720,512 B2 * 5/2014 Yamakawa ........... B60C 13/001
152/523

FOREIGN PATENT DOCUMENTS

| JP | 04129806 | A | * | 4/1992 |
| JP | 06032114 | A | * | 2/1994 |
| JP | 10-147114 | A | | 6/1998 |
| JP | 10147113 | A | * | 6/1998 |
| JP | 2004182036 | A | * | 7/2004 |
| JP | 2007022367 | A | * | 2/2007 |
| WO | 01/17801 | A1 | | 3/2001 |
| WO | 2011/138867 | A1 | | 11/2011 |

OTHER PUBLICATIONS

English translation of JP 60-38211 A, Feb. 27, 1985.*
International Search Report dated Nov. 4, 2013 of international application PCT/EP2013/066045 on which this application is based.
Written Opinion dated Nov. 4, 2013 of international application PCT/EP2013/066045 on which this application is based.

* cited by examiner

DETAIL V

Fig. 5

SECTION III-III

Fig. 3

SECTION IV-IV

PNEUMATIC VEHICLE TIRE WITH SPECIFIED CIRCUMFERENTIAL SIDE WALL GROOVE

CROSS REFERENCE TO RELATED APPLICATIONS

This application is a continuation application of international patent application PCT/EP2013/066045, filed Jul. 31, 2013, designating the United States and claiming priority from German application 10 2012 108 455.6, filed Sep. 11, 2012, and the entire content of both applications is incorporated herein by reference.

FIELD OF THE INVENTION

The invention relates to a vehicle tire, in particular a pneumatic vehicle tire, having a profiled tread and having two sidewalls, wherein, on at least one sidewall, in particular in the outer half of the radial extent of the sidewall, an—in particular hatched—pattern which extends over the entire circumference of the tire is formed in a groove which extends over the entire circumference of the tire and which is oriented substantially in a circumferential direction U, the groove being formed with first groove segments and with second groove segments which are arranged one after the other in an alternating sequence in the circumferential direction U, wherein the groove segments are delimited radially to the outside in each case by a radially outer delimiting flank, which delimits the groove radially to the outside, and radially to the inside by a radially inner delimiting flank which delimits the groove radially to the inside.

BACKGROUND OF THE INVENTION

In the case of pneumatic vehicle tires of this type, it is known, for example for the purposes of easy visual identification of the tire type or tire dimensions, for a wide circumferential groove, which extends over the entire circumference of the pneumatic vehicle tire and which is provided with a hatched pattern in the base of the groove, to be formed in the radially outer region of extent of the sidewall, radially outside the labeling sections formed in the sidewall, between the labeling sections and the tread. The selected width of the circumferential groove, the position of the circumferential groove and the selected hatching type should permit rapid identification of the exact tire type and/or the tire dimension. Such grooves are used for this purpose in the case of utility vehicles. This allows rapid gathering of initial information for necessary tire state inspections, tire change work or for retreading work that is to be performed. In the case of new tires, these rapid-identification grooves are normally clearly identifiable as grooves which extend in the manner of a circular ring around the entire circumference of the pneumatic vehicle tire and which have a defined position, width and pattern. However, abrasion against curb edges or during use on construction sites, which typically subjects particular radial sections of the sidewall to particularly intense abrasion depending on the intended use on the construction sites, has the effect that, in a usage situation specifically in the abrasion areas that are particularly critical with regard to the selected position of the circumferential groove, the circumferential groove is rubbed away uniformly over the entire circumference, and thus the circumferential groove can undesirably rapidly lose its prominence for tire identification purposes.

SUMMARY OF THE INVENTION

It is an object of the invention to increase, using simple means, the life span of such vehicle tires with circumferential grooves, formed hatched patterns, in the sidewall.

The object is achieved according to the invention via a configuration of a vehicle tire, in particular a pneumatic vehicle tire, having a profiled tread and having two sidewalls, wherein, on at least one sidewall, in particular in the outer half of the radial extent of the sidewall, a repeating pattern, in particular a hatched pattern, which extends over the entire circumference of the tire is formed in a groove which extends over the entire circumference of the tire and which is oriented substantially in a circumferential direction U, the groove being formed with first groove segments and with second groove segments which are arranged one after the other in an alternating sequence in the circumferential direction U, wherein the groove segments are delimited radially to the outside in each case by a radially outer delimiting flank, which delimits the groove radially to the outside, and radially to the inside by a radially inner delimiting flank which delimits the groove radially to the inside, according to one embodiment, wherein the first groove segments are arranged radially outside the second groove segments, wherein the transition between the first groove segment and adjacent second groove segment is formed in each case as a radial offset of the groove radially inward by the offset dimension (a), and the transition between the second groove segment and first groove segment adjacent thereto is formed in each case as a radial offset of the groove radially outward by the offset dimension (a), and wherein the first groove segment is formed with its maximum width $B_1$, measured in the radial direction R, at least in one circumferential extent section, where $a \geq B_1$, and the second groove segment is formed with its maximum width $B_2$, measured in the radial direction R, at least in one circumferential extent section, where $a \geq B_2$.

Through this configuration, it is made possible that, during use of the tire, in each case only a part of the circumferential groove provided with the hatched pattern is subjected to abrasion over the full circumference, and the other circumferential sections, owing to their position offset in the radial direction, remain substantially protected from abrasion for this usage situation in areas particularly critical with regard to abrasion. In this way, the influence of typical abrasion against curb edges, or the influence of use under particularly abrasion-intense conditions on a construction site, on the rapid identifiability of the tire can be reduced. In this way, depending on the particular main purpose of the vehicle, and thus of the tires, one or the other set of circumferential sections remains protected, and thus maintains an increased lifespan. In this way, the circumferential groove can perform its assigned function over a longer lifespan.

To ensure optimum protection, the configuration of a vehicle tire according to one embodiment is particularly advantageous, wherein the first groove segments extend over a circumferential angle $\alpha$ of the tire, where $10° \leq \alpha \leq 50°$, measured along the extent of their flank which delimits the first groove segment radially to the outside, and wherein the second groove segments extend over a circumferential angle $\beta$ of the tire, where $10° \leq \beta \leq 50°$, measured along the extent of their flank which delimits the second groove segment radially to the outside.

The configuration of a vehicle tire according to one embodiment is particularly advantageous, wherein the circumferential angles α and β are configured such that α=β. In this way, the impact of the acting rubbing forces can be equalized.

The configuration of a vehicle tire according to one embodiment is particularly advantageous, wherein the radially outer delimiting flank which delimits the groove radially to the outside in the first groove segment is oriented so as to extend in the circumferential direction U, and forms a circular segment by way of its extent in the sidewall surface.

The configuration of a vehicle tire according to one embodiment is particularly advantageous, wherein the radially inner delimiting flank which delimits the groove radially to the inside in the first groove segment is oriented so as to extend in the circumferential direction U and forms a circular segment by way of its extent in the sidewall surface.

The configuration of a vehicle tire according to one embodiment is particularly advantageous, wherein the groove is, along its extent in the first groove segment, formed with the constant width $B_1$ at least over a circumferential angle γ, where γ≥2°.

The configuration of a vehicle tire according to one embodiment is particularly advantageous, wherein the groove is, in the first groove segment, formed with a width $B_3$ in each case in a circumferential section between the offset to the second groove segment and the extent section formed with constant width $B_1$, where $(\frac{1}{3}) B_1 \leq B_3 \leq B_1$.

The configuration of a vehicle tire according to one embodiment is particularly advantageous, wherein the groove, in the first groove segment, is formed with constant width $B_1$ along its extent from the offset to the preceding second groove segment in the circumferential direction to the following second groove segment in the circumferential direction.

The configuration of a vehicle tire according to one embodiment is particularly advantageous, wherein the first groove segment is formed with its maximum width $B_1$, measured in the radial direction R, at least in a circumferential extent section directly adjoining the offset.

The configuration of a vehicle tire according to one embodiment is particularly advantageous, wherein the radially outer delimiting flank which delimits the groove radially to the inside in the second groove segment is oriented so as to extend in the circumferential direction U and forms a circular segment by way of its extent in the sidewall surface.

The configuration of a vehicle tire according to one embodiment is particularly advantageous, wherein the second groove segment is formed with its maximum width $B_2$, measured in the radial direction R, at least in a circumferential extent section directly adjoining the offset.

The configuration of a vehicle tire according to one embodiment is particularly advantageous, wherein the groove, in the second groove segment, is formed with constant width $B_2$ along its extent from the offset to the preceding first groove segment in the circumferential direction to the following first groove segment in the circumferential direction.

The configuration of a vehicle tire according to one embodiment is particularly advantageous, wherein the widths $B_1$ and $B_2$ are configured such that $(0.25 B_1) \leq B_2 \leq B_1$.

BRIEF DESCRIPTION OF THE DRAWINGS

The invention will now be described with reference to the drawings wherein.

DESCRIPTION OF THE PREFERRED EMBODIMENTS OF THE INVENTION

FIGS. 1 to 5 show a pneumatic vehicle tire of known type, which is delimited toward the outside in a radial direction R, toward the road surface, by a profiled tread. To both sides in an axial direction A, the pneumatic vehicle tire of radial type of construction is formed with a respective tire sidewall which extends inward in the radial direction R from the profiled tread 1 to the bead region 3 and which is in each case delimited toward the outside in the axial direction A, to the side pointing away from the tire, by a sidewall rubber strip 2 of known type. FIGS. 2 to 5 show in each case only that section of the tire which points toward the right-hand tire shoulder, and the sidewall, with the sidewall rubber strip 2, which delimits the tire toward that side in the axial direction A. To the inside in the radial direction R, there is formed on each tire sidewall a respective bead region 3 with a tension-resistant bead core of known type extending in the circumferential direction U, via which the tire is fastened to the wheel rim.

Figure 1:
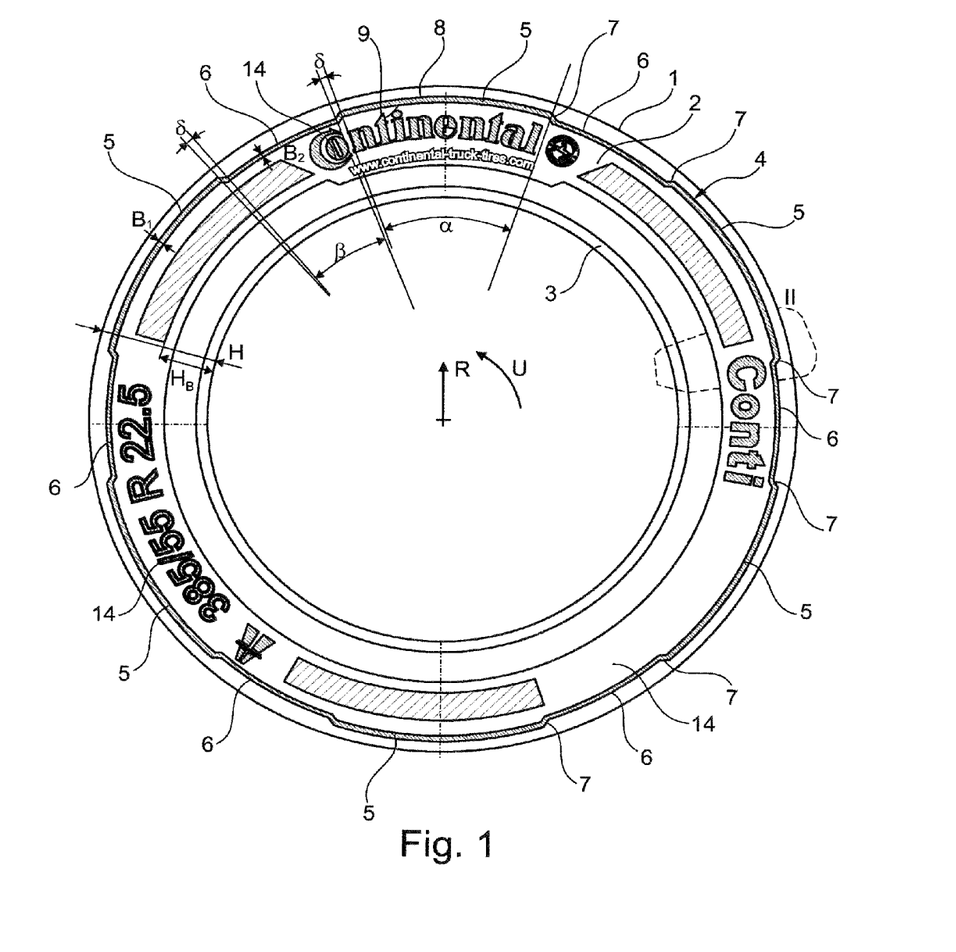
FIG. 1 shows a pneumatic vehicle tire in a side view.

The pneumatic vehicle tire is formed with a tire height H measured in the radial direction R and with a maximum width B, which are measured in the installed state under standardized conditions. The maximum width B is in this case formed at a radial position and radial distance $H_B$ from the radially inner end of the extent of the tire cross section in the installed state. As can be seen in FIG. 1, in that surface of the sidewall rubber strip 2 which points away from the tire in the axial direction A, multiple sections 14 in which labels are provided are formed in the region of the tire sidewall in a manner distributed over the circumference of the tire in the circumferential direction U of the pneumatic vehicle tire. The sections 14 are formed in a radial extent region radially outside the bead region 3. As can be seen in FIG. 1, radially outside the position of the sections 14, between the sections 14 and the profiled tread 1, in that surface of the sidewall rubber strip 2 which points away from the tire in the axial direction A of the pneumatic vehicle tire, there is formed a groove 4 which extends over the entire circumference of the pneumatic vehicle tire and which is oriented substantially in the circumferential direction U. As shown in FIGS. 1, 2, 3 and 4, the groove 4 is delimited in the axial direction A toward the tire by a groove base 10 which extends over the entire circumference of the pneumatic vehicle tire and which is provided with hatching. The groove 4 is delimited to the outside in the radial direction R by a groove flank 8 and to the inside in the radial direction R by a groove flank 9. The groove flanks 8 and 9 each extend substantially perpendicular to the surface of the groove base 10 from the groove base 10 to the surface which delimits the sidewall rubber strip 2 to the outside in the axial direction A.

Figure 2:
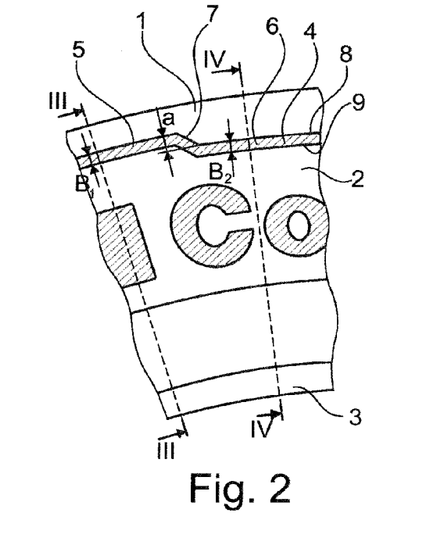
FIG. 2 shows an enlarged detail of the pneumatic vehicle tire of FIG. 1 in a side view.
Figure 3:
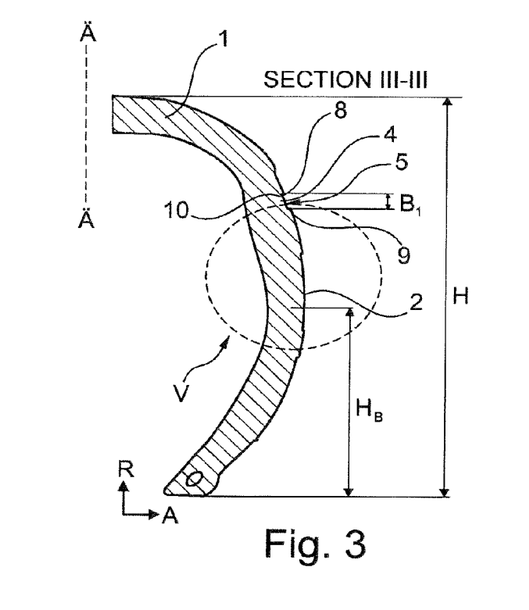
FIG. 3 is a cross section of the tire of FIG. 2 as per the section in FIG. 2.
Figure 4:
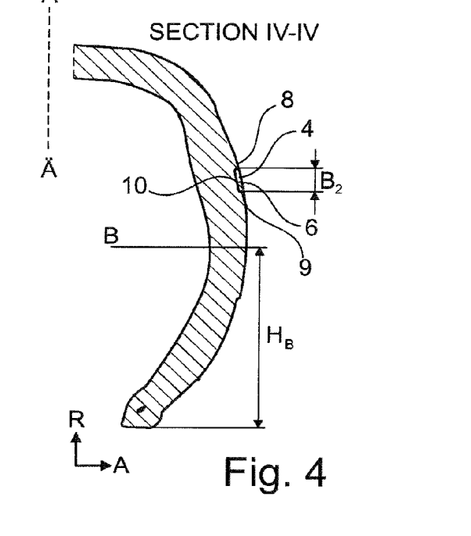
FIG. 4 is a cross section of the tire of FIG. 2 as per the section IV-IV in FIG. 2.

Viewed in the circumferential direction U of the pneumatic vehicle tire, the groove 4 is formed from multiple first, radially outer groove segments 5 and second, radially inner groove segments 6 arranged one after the other in an alternating sequence. As shown in FIG. 1, by way of example, six first groove segments 5 and six second groove segments 6 are formed so as to be distributed one after the other in an alternating sequence over the circumference of the tire. As shown in FIG. 1, the first groove segments 5 extend, by way of the groove flank 8 which delimits the groove segment 5 in each case to the outside in the radial direction R, in the circumferential direction U over a circumferential angle $\alpha$ of the pneumatic vehicle tire, and the second groove segments 6 extend, by way of the groove flank 9 which delimits the groove segment 6 in each case to the inside in the radial direction R, over a circumferential extent angle $\beta$ of the pneumatic vehicle tire about the tire axis. In this case, the angles $\alpha$ and $\beta$ are selected such that $10° \leq \alpha \leq 50°$ and $10° \leq \beta \leq 50°$. In this case, in the groove segment 5, along the extent of the groove segment 5, the groove flank 8 is oriented in the circumferential direction of extent U of the pneumatic vehicle tire. In the embodiment shown in FIG. 1, the groove 4 in the axially outwardly pointing surface of the sidewall rubber strip 2 is, along its extent in the groove segment 5, formed with a constant width $B_1$ measured in the radial direction R between groove flank 8 and groove flank 9 in the radial direction R. At the end of the extent of a groove segment 5 measured in the circumferential direction U, the groove 4 is formed in each case with a transition section 7 which extends over a circumferential angle of extent $\delta$, where $\delta \leq 2°$, for example $\delta=1°$, and which opens into the radially inner groove segment 6 which is adjacent in the circumferential direction U. In the transition section 7, the groove 4 extends with its groove flanks 8 and 9 substantially rectilinearly. In the transition section 7, the groove 4 is, proceeding from the radially outer groove segment 5 preceding the transition section 7 in the circumferential direction U, formed with an offset in the radial direction R, toward the inside in the radial direction by the offset dimension (a), into the radially inner groove segment 6 following the transition section in the circumferential direction U. Then, following the groove segment 6 in the circumferential direction U, at the end of the extent of the groove segment 6, there is analogously formed, in turn, a transition section 7 at which the groove 4 transitions, with a corresponding radial offset toward the outside by the offset dimension (a), into the radially outer groove segment 5 that follows in the circumferential direction U. In the embodiment of FIGS. 1 to 5, the groove segment 6 is, by way of its flank 9 directed inward in the radial direction R, oriented in each case in the circumferential direction U. In this case, the groove 4 in the axially outwardly pointing surface of the sidewall rubber strip 2 is formed with a constant width $B_2$, measured in the radial direction R, along its extent in the groove segment 6 between the transition section 7 preceding the groove segment 6 to the transition section 7 following the groove segment 6. As shown in FIG. 2, the dimension of the offset (a) is measured as the dimension of the offset, running inwardly in the radial direction R, of the radially outer flank 8 between the groove segment 5 preceding the transition 7 and the groove segment 6 following the transition 7.

Figure 5:
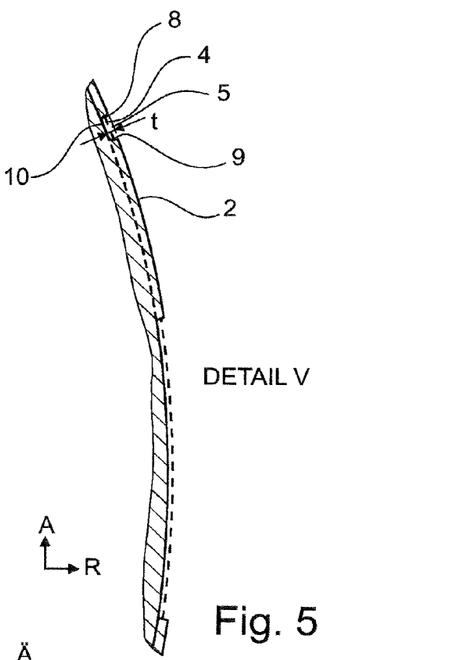
FIG. 5 shows a detail of the cross section of the tire of FIG. 3 on an enlarged scale.

In this case, the offset dimension (a) is selected such that $a \geq B_1$ and $a \geq B_2$. The dimension $B_1$ is selected such that $4\ \text{mm} \leq B_1 \leq 12\ \text{mm}$. The dimension $B_2$ is selected such that $4\ \text{mm} \leq B_2 \leq 12\ \text{mm}$. The depth (t), which is measured perpendicular to the groove base 10, and which—as shown in FIG. 5—denotes the vertical distance between the groove base 10 and the shell surface, projected beyond the groove 4, of the sidewall surface pointing away from the tire, is configured such that $0.5\ \text{mm} \leq t \leq 3\ \text{mm}$.

In the segment section 5 and in the segment section 6, the groove flank 8 forms in each case a circular segment about the tire axis. In the segment section 5 and in the segment section 6, the groove flank 9 forms in each case a circular segment about the tire axis.

The hatching formed in the groove base 10 of the groove 4 is formed with a hatching depth of at least 0.5 mm to at most 1 mm.

In an embodiment shown in FIG. 1, dimensions have been selected such that $B_1 = B_2$ and in an embodiment shown in FIG. 1, dimensions have been selected such that $\alpha = (\beta + \delta) = 36°$.

The variables $B_1$, $B_2$ and (a) are configured for example such that $B_1 = B_2 = 6\ \text{mm}$ and $a = 8\ \text{mm}$.

Figure 6:
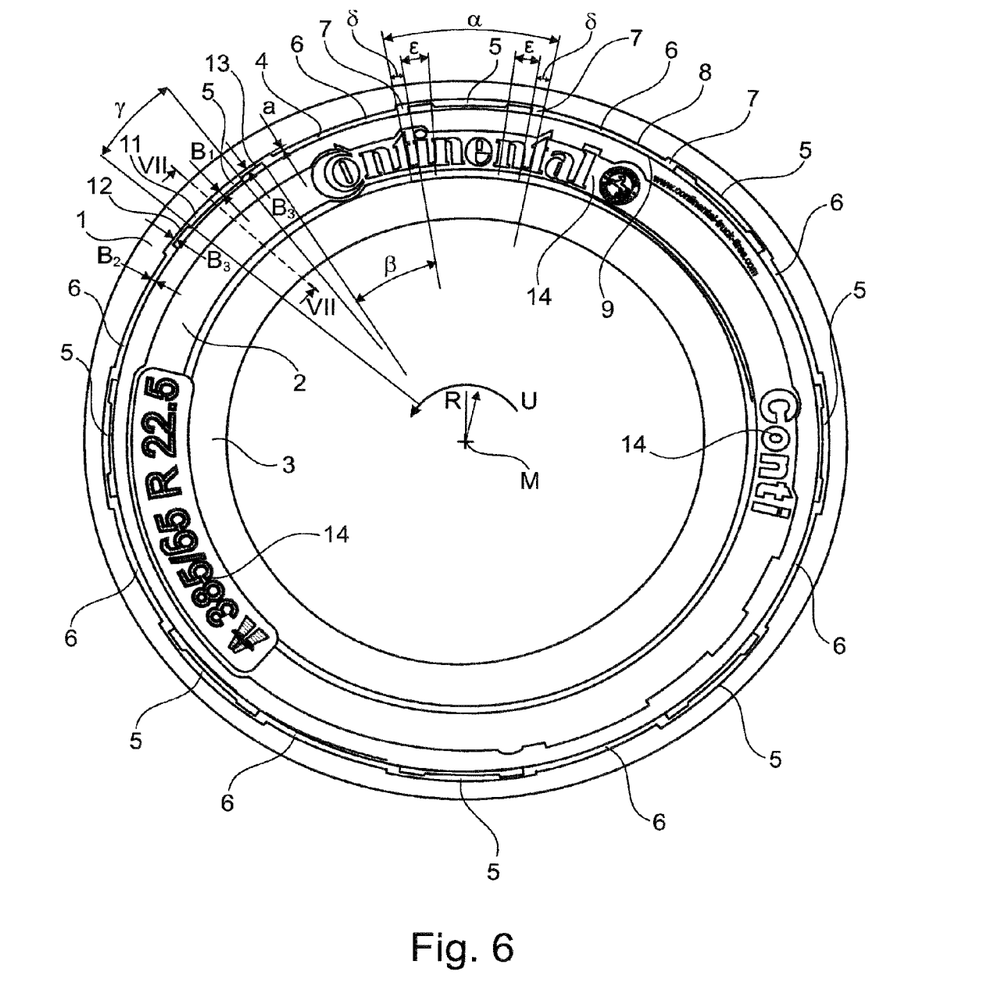
FIG. 6 shows a side view of a pneumatic vehicle tire with an alternative configuration of the groove.
Figure 7:
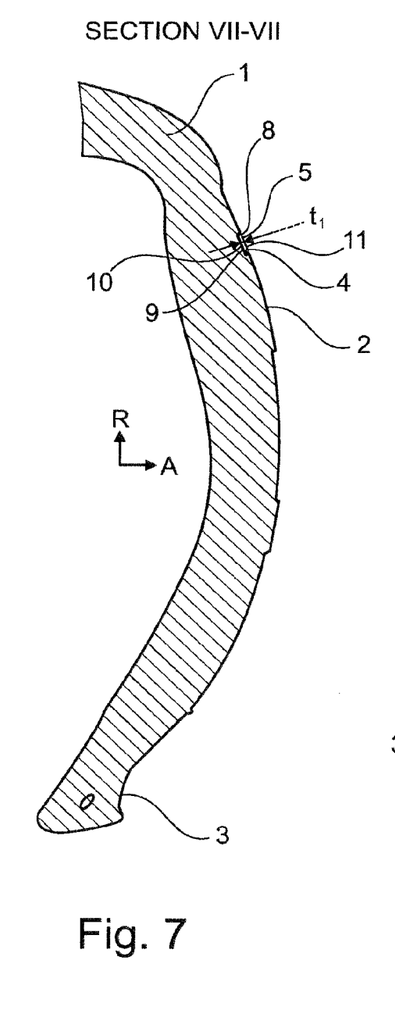
FIG. 7 is a cross section of the tire of FIG. 6 as per the section VII-VII on an enlarged scale.

FIGS. 6 and 7 show an alternative embodiment of the groove 4, wherein the groove 4, in the radially inner groove segments 6, likewise extends over an angle $\beta$ and is oriented in the circumferential direction in each case by way of its radially inwardly directed flank 9. In the radially outer groove segments 5, the groove 4 is formed so as to be oriented in the circumferential direction U and so as to extend over an angle $\alpha$ in each case by way of its radially outwardly directed groove flank 8. In this embodiment, the groove flank 8 of a circumferential segment 5 overlaps, in each case in the circumferential direction U, the groove flank 9 of the circumferential segment 6 which is adjacent in the circumferential direction U, the overlap being realized over a circumferential angle of extent 5 and thus forming, in the overlap section, the transition section 7. Between the transition section 7 which precedes a radially inner groove segment 6 in the circumferential direction U and the transition section 7 which follows the groove segment 6 in the circumferential direction U, the segment 6 is formed in each case in turn with a constant width $B_2$, measured in the radial direction R, along its entire extent. The groove segments 5 are, in each case in the circumferential direction U from the transition section 7 preceding the groove segment in the circumferential direction U in the direction of the transition section 7 following the groove segment 5, formed from a first lateral segment section 12 with a constant width $B_3$ measured in the radial direction R, from a central segment section 11 which adjoins the lateral segment section 12 in the circumferential direction U and which has the constant width $B_1$, and from a second lateral segment section 13 which adjoins the central segment section 11 in the circumferential direction U and which extends to the following transition section 7 and which has a constant width $B_3$ measured in the radial direction R. The widths $B_1$ and $B_3$ are each measured radially inward from the groove flank 8. In this case, in the groove segment 6, the groove flank 8 extends in circumferential direction U of the pneumatic vehicle tire between the transition section 7 arranged so as to follow the groove segment in the transition section 7 which precedes the groove segment in the circumferential direction U. In this case, the widths $B_1$ and $B_3$ are configured such that $B_1 > B_3$. In this case, $B_1$ forms the maximum width of the groove 4 in the groove segment 5. In this case, the lateral segment sections 12 and 13 extend in each case over a circumferential angle, where $\varepsilon \geq 2°$, for example $\varepsilon = 3°$. The width $B_3$ is in this case configured such that $(1/3)B_1 \leq B_3 \leq B_1$. In this case, the central segment section 11 extends in each case over a circumferential angle $\gamma$, where $\gamma \geq 2°$, for example $\gamma = 5°$.

In this embodiment, too, the offset (a) is configured such that a≥$B_1$ and a≥$B_2$. In the segment section 5, the groove flank 8 forms a circular segment about the tire axis, and in the segment section 6, the groove flank 8 and the groove flank 9 each form a circular segment about the tire axis.

Figure 8:
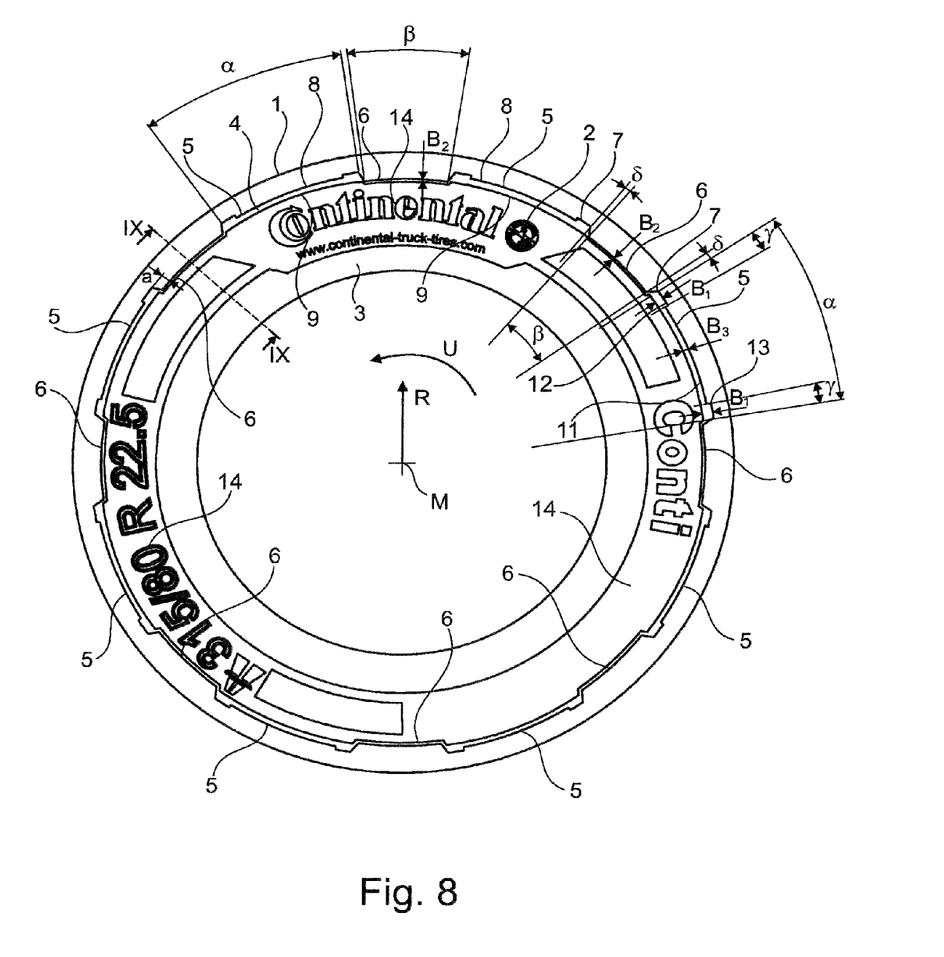
FIG. 8 shows a side view of a pneumatic vehicle tire with a further alternative configuration of the groove; and, FIG. 9 is a cross section of the tire of FIG. 8 as per the section IX-IX in FIG. 8 on an enlarged scale.
Figure 9:
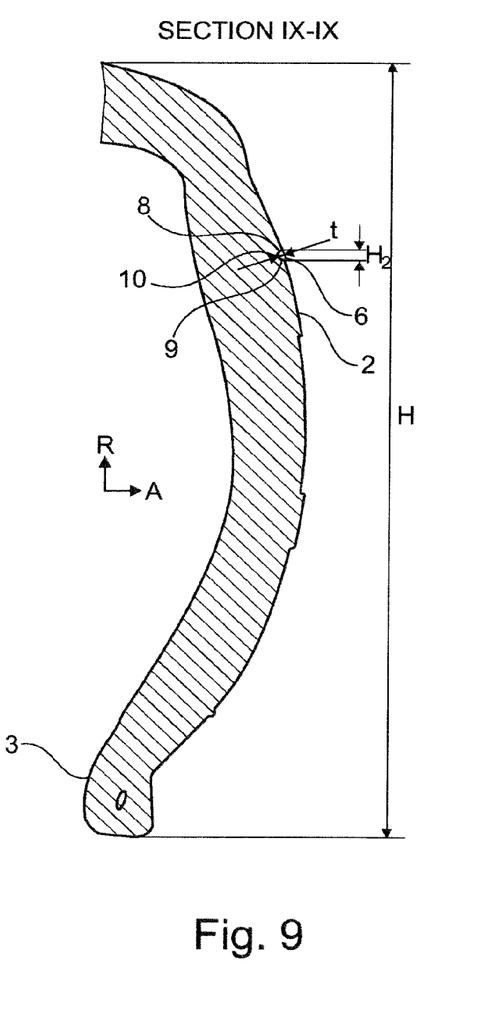

FIGS. 8 and 9 show a further embodiment of the groove 4, in which, in the radially inner groove segments 6, along the extent between the transition section 7 preceding the groove segment 6 and the transition section 7 following the groove segment 6, the groove flank 8 and the groove flank 9 each are oriented in the circumferential direction U and form a circular segment about the tire axis. In this case, the radially inner groove segments 6 extend with their radially inner flanks 9 oriented in the circumferential direction U over the angle β. In this embodiment, in the radially outer groove segments 5, the radially inner groove flank 9 is in each case oriented in the circumferential direction U, and forms a circular segment about the tire axis, along the extent between the transition section 7 preceding the groove segment 5 and the transition section 7 following the groove segment 5.

In this case, the circumferential segments 6 are formed with a constant width $B_2$ between the two transition sections 7 which delimit a groove segment 6 in the circumferential direction.

Between the transition sections 7 which delimit the circumferential sections 5 in each case in the circumferential direction U, the circumferential sections 5 are formed from a lateral segment section 12 which directly adjoins one transition section 7, from a lateral segment section 13 which directly adjoins the other transition section 7 which delimits the groove segment 5 in the circumferential direction U, and from a central segment section 11 formed between the two lateral segment sections 12 and 13. In this case, in the two lateral segment sections 12 and 13, the radially outer flank 8 is, in each case over the circumferential angle section γ, oriented in the circumferential direction U of the respective lateral section 12 or 13, and is thus of circular segment form at a radial distance $B_1$ from the groove flank 9. In the central segment section 11, the radially outer flank 8 is oriented in the circumferential direction U of the pneumatic vehicle tire and is of circular segment form at a radial distance $B_3$ from the flank 8 in the segment 5. The circumferential angle γ is configured such that γ≥2°, for example γ=5°. In the lateral segment sections 12 and 13 formed directly at the transition sections 7, the groove 4 is formed, in the groove segment 5, with a maximum width $B_1$. The width $B_3$ of the central segment section 11 is configured such that $B_3 \leq B_1$. In this embodiment, too, the offset (a) is measured from the flank 8 in the lateral sections 12 and 13, adjoining the transition region 7, of the groove segment 5, radially inward toward the groove segment 6, where a≥$B_1$ and a≥$B_2$. In the embodiment shown, $B_2$ is configured such that (⅓)$B_3 \leq B_2$.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 Profiled tread
2 Sidewall rubber strip
3 Bead region
4 Groove
5 Groove segment
6 Groove segment
7 Transition
8 Flank
9 Flank
10 Groove base
11 Central segment section
12 Lateral segment section
13 Lateral segment section
14 Labeling section

What is claimed is:

1. A vehicle tire defining a tire circumference and a circumferential direction, the vehicle tire comprising:
   a profiled tread;
   a first and a second side wall rubber strip, one on each axial side of the profiled tread, each side wall strip having a side wall surface forming part of the outer surface of the tire;
   at least one of said first and said second side wall strips having a groove extending over the entirety of the tire circumference on the outer surface of the tire;
   said groove having a repeating pattern formed therein over the entirety of the tire circumference;
   said groove having first and second groove segments each being oriented in the circumferential direction and being arranged in an alternating sequence in the circumferential direction;
   said first and second groove segments being arranged one behind the other in the alternating sequence in the circumferential direction;
   said at least one of said first and second side wall strips further having an outer delimiting flank delimiting said first and second groove segments radially outwardly and an inner delimiting flank delimiting said first and second groove segments radially inwardly;
   said first groove segments being arranged radially outside of said second groove segments so as to define respective first transitions from said first groove segments to adjacent ones of said second groove segments configured as first radial offsets of said groove by an offset dimension a radially inwardly and to define respective second transitions from said second groove segments to adjacent ones of said first groove segments configured as second radial offsets of said groove by an offset dimension a radially outwardly;
   said first groove segments each having a maximum width $B_1$ measured in the radial direction;
   said second groove segments each having a maximum width $B_2$ measured in the radial direction;
   said first groove segments each being configured to have said maximum width $B_1$ in at least a circumferential extension section thereof with said offset dimension a being ≥ said width $B_1$;
   said second groove segments being configured to have said maximum width $B_2$ in at least a circumferential extension section thereof with said offset dimension a being ≥ said width $B_2$,
   said first groove segments extend over a circumferential angle α lying in a range of 10°≤α≤50° measured along said outer delimiting flank; and,
   said second groove segments extend over a circumferential angle β lying in a range of 10°≤β≤50° measured along said outer delimiting flank.

2. The vehicle tire of claim 1, wherein said circumferential angle α and said circumferential angle β are equal to each other (α=β).

3. The vehicle tire of claim 1, wherein:
said outer delimiting flank extends oriented in the circumferential direction in said first groove segments and forms a circular segment in the side wall surface of said at least one of said first and second side wall strips.

4. The vehicle tire of claim 1, wherein:
said inner delimiting flank extends oriented in the circumferential direction in said first groove segments and forms a circular segment in the side wall surface of said at least one of said first and second side wall strips.

5. The vehicle tire of claim 1, wherein said groove in said first groove segments is configured with a constant maximum width $B_1$ along its extent at least over a circumferential angle $\gamma$ with $\gamma \geq 2°$.

6. The vehicle tire of claim 5, wherein:
each of said first groove segments in a circumferential section between the corresponding one of said first radial offsets and the extension section having said constant maximum width $B_1$ have a width $B_3$ with $(\frac{1}{3})B_1 \leq B_3 \leq B_1$.

7. The vehicle tire of claim 5, wherein each of said first groove segments is formed with a constant maximum width $B_1$ measured in the radial direction from a corresponding one of said first radial offsets to the second groove segment in the circumferential direction up to the next second groove segment in the circumferential direction.

8. The vehicle tire of claim 5, wherein each of said first groove segments have said maximum width $B_1$ at least in a circumferential extent section directly adjoining the corresponding one of said first radial offsets.

9. The vehicle tire of claim 1, wherein:
said inner delimiting flank extends oriented in the circumferential direction in said second groove segments and forms a segment of a circle in said side wall surface of said at least one of said first and second side wall strips.

10. The vehicle tire of claim 9, wherein:
each of said second groove segments have said maximum width $B_2$ at least in a circumferential extent section directly adjoining the corresponding one of said second radial offsets.

11. The vehicle tire of claim 1, wherein each of said second groove segments is formed with a constant maximum width $B_2$ measured in the radial direction from a corresponding one of said second radial offsets to the first groove segment in the circumferential direction up to the next first groove segment in the circumferential direction.

12. The vehicle tire of claim 1, wherein said first maximum width and said second maximum width are configured such that $0.25\, B_1 \leq B_2 \leq B_1$.

13. The vehicle tire of claim 1, wherein the vehicle tire is a pneumatic vehicle tire.

14. The vehicle tire of claim 1, wherein:
said first side wall surface and said second side wall surface each have a radial extent including an outer half of said radial extent; and,
said at least one of said first and said second side wall strips having said groove disposed in said respective outer half of said radial extent.

15. The vehicle tire of claim 1, wherein said repeating pattern is a hatched pattern.

* * * * *

UNITED STATES PATENT AND TRADEMARK OFFICE
CERTIFICATE OF CORRECTION

PATENT NO.      : 9,487,053 B2
APPLICATION NO. : 14/645270
DATED           : November 8, 2016
INVENTOR(S)     : Stefan Rittweger Page 1 of 1

It is certified that error appears in the above-identified patent and that said Letters Patent is hereby corrected as shown below:

In the Specification

In Column 4:
Line 2: add -- III-III -- after "section".

In Column 6:
Line 32: delete "5" and substitute -- δ -- therefor.

Signed and Sealed this
Twenty-eighth Day of February, 2017

Michelle K. Lee
*Director of the United States Patent and Trademark Office*